US009735587B2

(12) United States Patent
Niizuma (10) Patent No.: US 9,735,587 B2
(45) Date of Patent: Aug. 15, 2017

(54) WIRELESS POWER SUPPLY SYSTEM

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 199 days.

(21) Appl. No.: 14/709,835

(22) Filed: May 12, 2015

(65) Prior Publication Data

US 2015/0249348 A1    Sep. 3, 2015

Related U.S. Application Data

(63) Continuation of application No. PCT/JP2013/077460, filed on Oct. 9, 2013.

(30) Foreign Application Priority Data

Nov. 13, 2012   (JP) ................. 2012-249468

(51) Int. Cl.
*H02J 5/00* (2016.01)
*B60L 11/18* (2006.01)
*H02J 7/02* (2016.01)

(52) U.S. Cl.
CPC ............ *H02J 5/005* (2013.01); *B60L 11/182* (2013.01); *B60L 11/1833* (2013.01); *B60L 11/1838* (2013.01); *B60L 11/1861* (2013.01); *H02J 7/025* (2013.01); *B60L 2210/30* (2013.01); *B60L 2210/40* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(58) Field of Classification Search
CPC ....... H02J 5/005; H02J 7/025; B60L 11/1838; B60L 11/182; B60L 11/1861; B60L 11/1833; Y02T 90/12; Y02T 90/127; Y02T 10/7044; Y02T 10/7005; Y02T 10/7072
See application file for complete search history.

(56) References Cited

U.S. PATENT DOCUMENTS

| 6,127,942 A | 10/2000 | Welle |
| 2009/0052721 A1 | 2/2009 | Dabrowski |

(Continued)

FOREIGN PATENT DOCUMENTS

| CN | 101340855 A | 1/2009 |
| CN | 102595289 A | 7/2012 |

(Continued)

OTHER PUBLICATIONS

International Search Report, PCT/JP2013/077460, Nov. 12, 2013, 4 pgs total (2 pgs Japanese language; 2 pgs English language)

*Primary Examiner* — Jared Fureman
*Assistant Examiner* — Rafael Pacheco
(74) *Attorney, Agent, or Firm* — Volpe and Koenig, P.C.

(57) ABSTRACT

A wireless power supply system includes a power-supplying device having a power-supplying coil and a power-receiving device having a power-receiving coil and wirelessly supplies electric power from the power-supplying coil to the power-receiving coil, and the power-supplying device and the power-receiving device communicate with each other using an acoustic signal.

10 Claims, 4 Drawing Sheets

(56) References Cited

U.S. PATENT DOCUMENTS

| | | | |
|---|---|---|---|
| 2009/0271048 A1* | 10/2009 | Wakamatsu | G06F 1/266 700/296 |
| 2010/0215203 A1* | 8/2010 | Sip | H04R 5/04 381/386 |
| 2010/0320962 A1 | 12/2010 | Sekita et al. | |
| 2011/0204845 A1 | 8/2011 | Paparo et al. | |
| 2012/0071091 A1* | 3/2012 | Azancot | H02J 5/005 455/41.1 |
| 2014/0339911 A1* | 11/2014 | Abe | H02J 5/005 307/104 |

FOREIGN PATENT DOCUMENTS

| | | |
|---|---|---|
| JP | 2003-087898 A | 3/2003 |
| JP | 2003-348776 A | 12/2003 |
| JP | 2009-268311 A | 11/2009 |
| JP | 2010-093482 A | 4/2010 |
| JP | 2010-522534 A | 7/2010 |
| JP | 2011-030404 A | 2/2011 |
| JP | 2012-200056 A | 10/2012 |
| WO | 2008/114268 A2 | 9/2008 |

* cited by examiner

WIRELESS POWER SUPPLY SYSTEM

The present invention relates to a wireless power supply system.

This application is a continuation application based on a PCT Patent Application No. PCT/JP2013/077460, filed on Oct. 9, 2013, whose priority is claimed on Japanese Patent Application No. 2012-249468, filed Nov. 13, 2012. The contents of both the PCT application and the Japanese Patent Application are incorporated herein by reference.

TECHNICAL FIELD

Background Art

In a wireless power supply system, in order to supply electric power required by a power-receiving side without excess or deficiency, it may be necessary to transmit information from the power-receiving side to a power-supplying side and to appropriately control the power-supplying side. For example, the power-receiving side transmits a state of charge (SOC) of a storage battery mounted on the power-receiving side, a voltage or a current generated across a power-receiving coil of the power-receiving side, an amount of electric power received, and the like to the power-supplying side. Meanwhile, the power-supplying side adjusts electric power to be supplied, a power supply frequency, or a duty ratio or a driving frequency of pulse width modulation (PWM) control of a power supply circuit based on information received from the power-receiving side. For example, Patent Document 1 discloses a wireless power supply system in which a power-supplying side performs PWM control based on information from a power-receiving side.

DOCUMENT OF RELATED ART

Patent Document

Patent Document 1
Japanese Unexamined Patent Application, First Publication No. 2003-348776

SUMMARY OF INVENTION

Technical Problem

In the related art, radio waves or light waves are generally used for communication, but the radio waves or the light waves have the following problems. That is, the radio waves have a wavelength of several meters or longer. Accordingly, when a plurality of power-receiving devices or power-supplying devices adjacent to each other are used, it is necessary to pay extreme attention to prevention of crosstalk. Frequency band of several hundreds of MHz or more are often used, but it is difficult to perform communication in water. The light waves cannot be used for communication when light is blocked by a foreign object or a contaminant.

The present invention is conceived in view of the above-described circumstances and an object of the present invention is to transmit information between a power-receiving side and a power-supplying side without using radio waves or light waves and to appropriately control wireless supply of electric power.

Solution to Problem

According to a first aspect of the present invention, there is provided a wireless power supply system that includes a power-supplying device having a power-supplying coil and a power-receiving device having a power-receiving coil and that wirelessly supplies electric power from the power-supplying coil to the power-receiving coil, wherein the power-supplying device and the power-receiving device communicate with each other using an acoustic signal.

A second aspect of the present invention provides the wireless power supply system according to the first aspect, wherein the acoustic signal is transmitted using either or both of a cover covering the power-supplying coil and a cover covering the power-receiving coil.

A third aspect of the present invention provides the wireless power supply system according to the first aspect, wherein a transmission diaphragm is installed in a part of either or both of the cover covering the power-supplying coil and the cover covering the power-receiving coil, a sealing material having flexibility is installed in a boundary between the cover and the transmission diaphragm, and the acoustic signal is transmitted using the transmission diaphragm.

A fourth aspect of the present invention provides the wireless power supply system according to the third aspect, wherein the transmission diaphragm has a shape causing the acoustic signal to have directionality.

A fifth aspect of the present invention provides the wireless power supply system according to any one of the first to fourth aspects, wherein the acoustic signal is received using either or both of the cover covering the power-supplying coil and the cover covering power-receiving coil.

A sixth aspect of the present invention provides the wireless power supply system according to any one of the first to fourth aspects, wherein a reception diaphragm is installed in a part of either or both of the cover covering the power-supplying coil and the cover covering power-receiving coil, a sealing material having flexibility is installed in a boundary between the cover and the reception diaphragm, and the acoustic signal is received using the reception diaphragm.

A seventh aspect of the present invention provides the wireless power supply system according to any one of the first to sixth aspects, wherein the power-receiving device periodically transmits the acoustic signal during wireless supply of electric power, and the power-supplying device stops the supply of electric power when the periodic acoustic signal is not received during wireless supply of electric power.

An eighth aspect of the present invention provides the wireless power supply system according to the seventh aspect, wherein the power-receiving device stops the periodic transmission of the acoustic signal when the wireless supply of electric power is not necessary.

Effects of the Invention

According to the present invention, it is possible to transmit information between a power-receiving side and a power-supplying side without using radio waves or light waves and to appropriately control wireless supply of electric power, by enabling the power-supplying device and the power-receiving device to communicate with each other using an acoustic signal.

DESCRIPTION OF EMBODIMENTS

Hereinafter, an embodiment of the present invention will be described with reference to the accompanying drawings.

Figure 1:
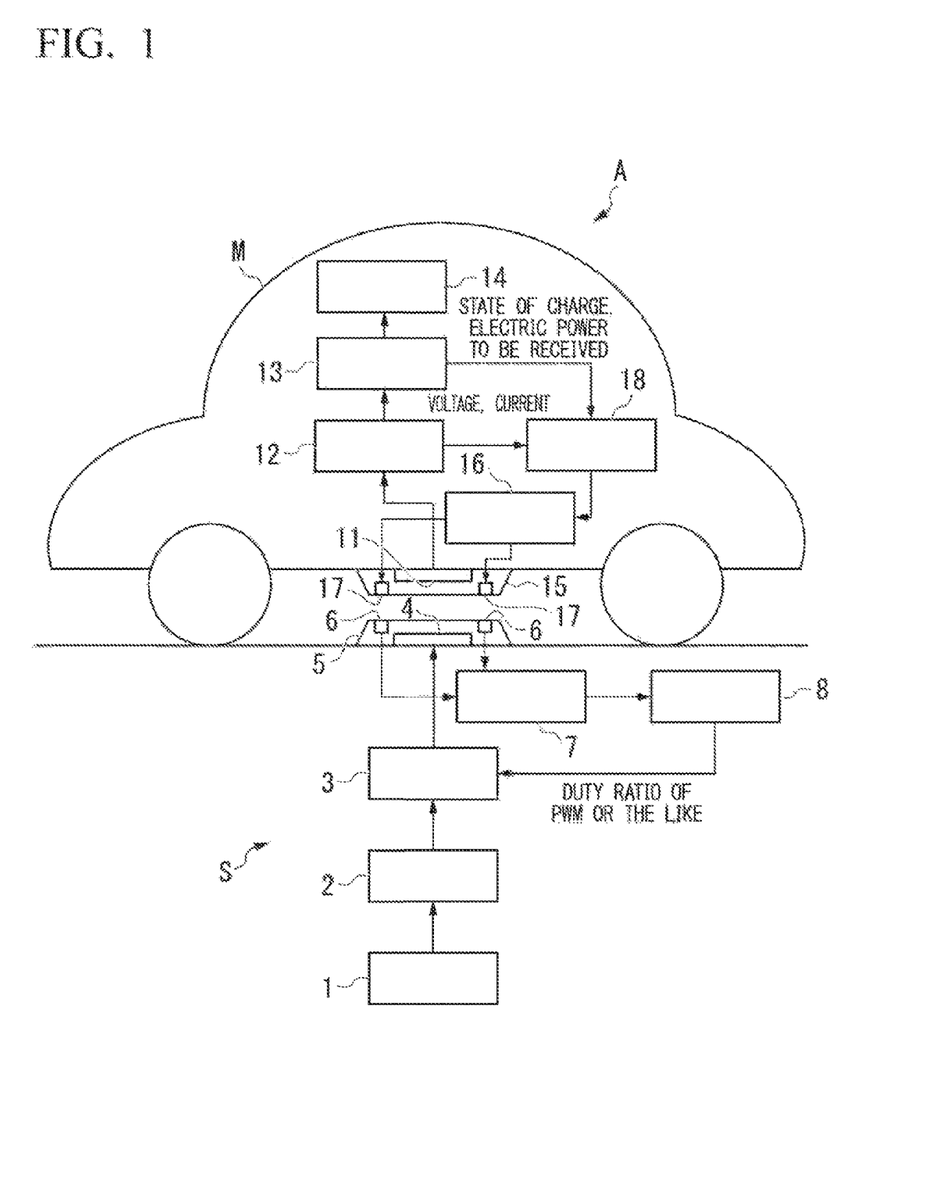
FIG. 1 is a block diagram showing a functional configuration of a wireless power supply system according to an embodiment of the present invention.

The wireless power supply system A according to the embodiment includes a power-supplying device S buried in the ground and a vehicle M (power-receiving device) supplied with electric power from the power-supplying device S. The wireless power supply system A wirelessly supplies electric power from the power-supplying device S to the vehicle M based on a magnetic resonance method which is a kind of wireless power supply method.

The power-supplying device S is buried, for example, at a stopping position at a crossroad or a crossing or a parking position in a parking lot and wirelessly supplies electric power to the vehicle M stopped or parked at the parking or stopping position. As shown in FIG. 1, the power-supplying device S includes a power source 1, a rectifier circuit 2, a power-supplying circuit 3, a power-supplying coil 4, a power-supplying coil cover 5, a receiver 6, a reception amplifier 7, and a power-supplying control unit 8.

The power source 1 is an AC power source whose output terminals are connected to input terminals of the rectifier circuit 2 and which supplies the rectifier circuit 2 with AC power necessary for supply of electric power to the vehicle M. The power source 1 is a system power source or a power generator that supplies, for example, three-phase AC power of 200 V or 400 V or single-phase AC power of 100 V.

The input terminals of the rectifier circuit 2 are connected to the power source 1 and the output terminals thereof are connected to the power-supplying circuit 3. The rectifier circuit 2 rectifies AC power supplied from the power source 1 using a rectifier element such as a diode, converts the AC power into DC power, and outputs the DC power to the power-supplying circuit 3. A DC power source such as a solar battery may be used as the power source 1 and the rectifier circuit 2 may be omitted (that is, DC power may be supplied from the DC power source to the power-supplying circuit 3).

The input terminals of the power-supplying circuit 3 are connected to the rectifier circuit 2 and the output terminals thereof are connected to both ends of the power-supplying coil 4. The power-supplying circuit 3 is a kind of inverter that converts DC power supplied from the rectifier circuit 2 into AC power (high-frequency power) having a frequency higher than that of the AC power from the power source 1 and supplies the AC power to the power-supplying coil 4 in accordance with a control command input from the power-supplying control unit 8, and the power-supplying circuit 3 includes a resonance capacitor which constitutes a power-supplying resonance circuit along with the power-supplying coil 4.

The power-supplying coil 4 is a helical coil having a predetermined coil diameter and is installed in the parking or stopping position in a posture in which a coil axis is arranged in the up-down direction (vertical direction) at a height just above the ground surface or just below the ground surface. Both ends of the power-supplying coil 4 are connected to the output terminals of the power-supplying circuit 3, and the power-supplying coil 4 to which the high-frequency power is supplied from the power-supplying circuit 3 wirelessly supplies electric power to the vehicle M by generating a magnetic field. The power-supplying coil 4 may be molded with a nonmagnetic and nonconductive material such as a plastic that does not interfere with the magnetic field.

The power-supplying coil cover 5 is formed of a nonmagnetic and nonconductive material such as an engineering plastic or a fiber-reinforced plastic (FRP) not affecting the magnetic field generated from the power-supplying coil 4, and is installed on the ground surface with the power-supplying coil 4 incorporated therein. The power-supplying coil cover 5 includes a circular flat cover 5a facing an end face of the power-supplying coil 4 and a side cover 5b covering the side surface of the power-supplying coil 4 and is sealed.

Figure 2A:
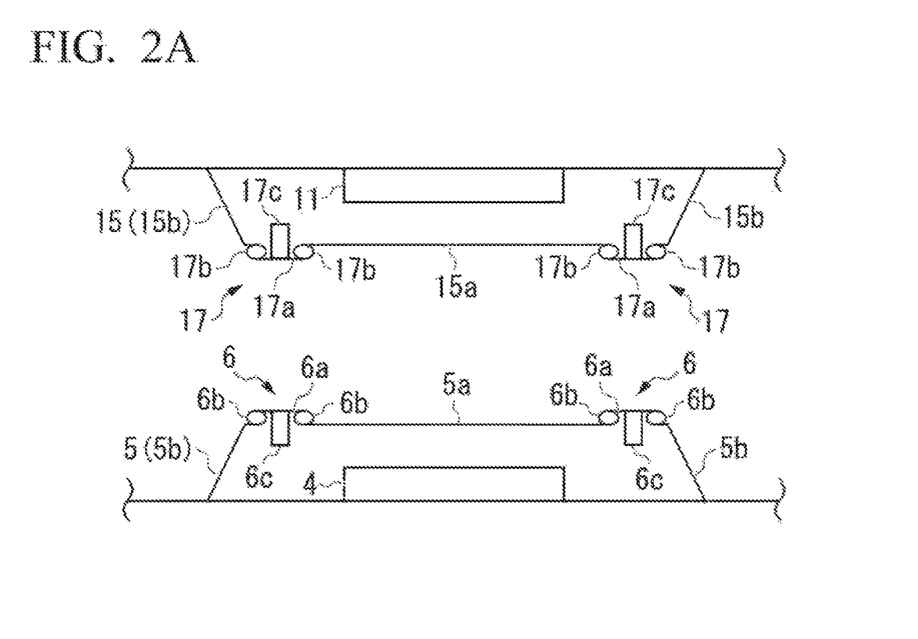
FIG. 2A is a cross-sectional view of receivers and transmitters according to the embodiment of the present invention.
Figure 2B:
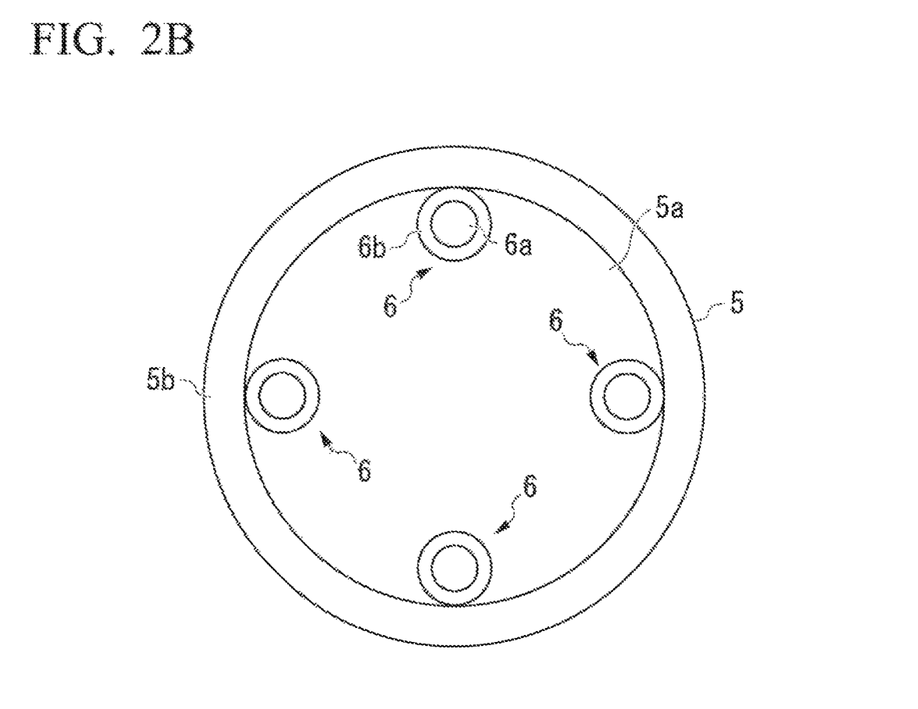
FIG. 2B is a top view of the receivers according to the embodiment of the present invention.

As shown in FIG. 2A, the receiver 6 is a microphone that includes a reception diaphragm 6a, a sealing material 6b, and a pickup coil 6c and receives an acoustic signal transmitted from the vehicle M. Four receivers are arranged at equal intervals on the flat cover 5a along the outer circumference of the flat cover 5a of the power-supplying coil cover 5 as shown in FIG. 2B.

The reception diaphragm 6a is, for example, a circular resin plate member or a circular metal diaphragm, adheres to the sealing material 6b, and is installed in the power-supplying coil cover 5 with the sealing material 6b sandwiched therebetween, and the pickup coil 6c is fixed to the inner surface side thereof. The reception diaphragm 6a is vibrated by an acoustic signal which is transmitted from the vehicle M and propagates in the air. The pickup coil 6c generates an electromotive force corresponding to the acoustic signal by electromagnetic induction and outputs electric power generated from the electromotive force as an acoustic signal to the reception amplifier 7.

The flat cover 5a has a size larger than that of an area through which a magnetic field generated from the power-supplying coil 4 and acting on the power-receiving coil 11 so as to wirelessly supply electric power passes, and is disposed at a position at which the pickup coil 6c is not affected by the magnetic field and does not affect the magnetic field. That is, the size of the flat cover 5a is set so that the magnetic field generated from the power-supplying coil 4 and acting on the power-receiving coil 11 so as to wirelessly supply electric power passes through the vicinity of the center of the flat cover 5a and the magnetic field is sufficiently small in the outer circumferential portion of the flat cover 5a in which the pickup coil 6c is disposed. Accordingly, it is possible to prevent a decrease in the wireless power supply efficiency due to an influence of metal parts (such as wires of the coil) constituting the pickup coil 6c and to prevent the pickup coil 6c from detecting an erroneous signal due to an influence of a magnetic field for the wireless supply of electric power.

Since the side cover 5b disposed outside the outer circumferential portion of the flat cover 5a is located at a position through which the magnetic field generated from the power-supplying coil 4 does not pass, the side cover 5b may be formed of a metal instead of the nonmagnetic and nonconductive material.

The sealing material 6b is an O ring annularly-shaped of a flexible member of rubber or the like and is installed at the boundary between the power-supplying coil cover 5 and the reception diaphragm 6a, that is, is sandwiched between the power-supplying coil cover 5 and the reception diaphragm 6a. The sealing material 6b adheres to the power-supplying coil cover 5 and the reception diaphragm 6a, whereby the power-supplying coil cover 5 is air-tightly sealed without interfering with the vibration of the reception diaphragm 6a based on an acoustic signal.

The reception amplifier 7 amplifies the acoustic signal input from the pickup coil 6c and outputs the amplified acoustic signal to the power-supplying control unit 8.

The power-supplying control unit 8 is a software control device that includes a microprocessor and a memory and operates based on a predetermined power-supplying control program, and comprehensively controls the power-supplying device S. As details will be described later, the power-supplying control unit 8 controls the power-supplying circuit 3, for example, based on a control program stored in a nonvolatile storage unit therein and the acoustic signal from the reception amplifier 7.

The vehicle M is an automobile that is driven to travel on a road by a driver and is, for example, an electric vehicle or a hybrid vehicle that travels using electric power as a driving power source. As shown in FIG. 1, the vehicle M includes a power-receiving coil 11, a power-receiving circuit 12, a charging circuit 13, a battery 14, a power-receiving coil cover 15, a transmission amplifier 16, a transmitter 17, and a power-receiving control unit 18. Although not shown in FIG. 1, the vehicle M further includes constituent elements necessary for traveling such as a travel motor, an operating handle, and a brake.

The power-receiving coil 11 is a helical coil having substantially the same coil diameter as the power-supplying coil 4 of the power-supplying device S, and is installed on the bottom of the vehicle M in a posture in which a coil axis is arranged in the up-down direction (vertical direction) so as to face the power-supplying coil 4. Both ends of the power-receiving coil 11 are connected to the input terminals of the power-receiving circuit 12, and the power-receiving coil generate an electromotive force and output the electromotive force to the power-receiving circuit 12 when the magnetic field generated from the power-supplying coil 4 acts thereon.

The input terminals of the power-receiving circuit 12 are connected to both ends of the power-receiving coil 11, and the output terminals thereof are connected to input terminals of the charging circuit 13. The power-receiving circuit 12 includes a resonance capacitor that constitutes a power-receiving resonance circuit along with the power-receiving coil 11, and is a kind of rectifier circuit that converts AC power supplied from the power-receiving coil 11 into DC power using a rectifier element such as a diode and supplies the DC power to the charging circuit 13. The capacitance of the resonance capacitor of the power-receiving circuit 12 is set so that the resonance frequency of the power-supplying resonance circuit is equal to the resonance frequency of the power-receiving resonance circuit.

The input terminals of the charging circuit 13 are connected to the output terminals of the power-receiving circuit 12, the output terminals thereof are connected to input terminals of the battery 14, and the battery 14 is charged with electric power (DC power) supplied from the power-receiving circuit 12. The battery 14 is a rechargeable battery (a secondary battery such as a lithium ion battery or a nickel-hydrogen battery) mounted on the vehicle M and supplies drive power to a traveling motor (not shown) or the like.

The power-receiving coil cover 15 is formed of a non-magnetic and nonconductive material such as an engineering plastic or a fiber-reinforced plastic (FRP) that does not affect the magnetic field generated from the power-receiving coil 11, and is installed on the bottom of the vehicle M with the power-receiving coil 11 incorporated therein. The power-receiving coil cover 15 includes a circular flat cover 15a facing an end face of the power-receiving coil 11 and a side cover 15b covering the side surface of the power-receiving coil 11 and is air-tightly sealed.

The transmission amplifier 16 amplifies an acoustic signal input from the power-receiving control unit 1 and outputs the amplified acoustic signal to the transmitter 17.

As shown in FIG. 2A, the transmitter 17 is a loud speaker that includes a transmission diaphragm 17a, a sealing material 17b, and a voice coil 17c and that transmits an acoustic signal to the power-supplying device S. Four transmitters are arranged at equal intervals on the flat cover 15a along the outer circumference of the flat cover 15a of the power-receiving coil cover 15 similarly to the receivers 6 (see FIG. 2B).

The transmission diaphragm 17a is, for example, a circular sheet of paper or a circular resin or metal sheet, adheres to the sealing material 17b, and is installed in the power-receiving coil cover 15 with the sealing material 17b sandwiched therebetween, and the voice coil 17c is fixed to the inner surface side thereof. The transmission diaphragm 17a vibrates due to the voice coil 17c and transmits an acoustic signal to the power-supplying device S.

The flat cover 15a has a size larger than that of an area through which a magnetic field generated from the power-supplying coil 4 and acting on the power-receiving coil 11 so as to wirelessly supply electric power passes, and is disposed at a position at which the voice coil 17c is not affected by the magnetic field and does not affect the magnetic field. That is, the size of the flat cover 15a is set so that the magnetic field generated from the power-supplying coil 4 and acting on the power-receiving coil 11 so as to wirelessly supply electric power passes through the vicinity of the center of the flat cover 15a and the magnetic field is sufficiently small in the outer circumferential portion of the flat cover 15a in which the voice coil 17c is disposed. Accordingly, it is possible to prevent a decrease in the wireless power supply efficiency due to an influence of metal parts (such as wires of the coil) constituting the voice coil 17c and to prevent the voice coil 17c from generating an erroneous signal due to an influence of a magnetic field for the wireless supply of electric power.

Since the side cover 15b disposed outside the outer circumferential portion of the flat cover 15a is located at a position through which the magnetic field acting on the power-receiving coil 11 does not pass, the side cover 15b may be formed of a metal instead of the nonmagnetic and nonconductive material.

The sealing material 17b is an O ring annularly-shaped of a flexible member of rubber or the like and is installed at the boundary between the power-receiving coil cover 15 and the transmission diaphragm 17a. That is, the sealing material 17b is sandwiched between the power-receiving coil cover 15 and the transmission diaphragm 17a. The sealing material 17b adheres to the power-receiving coil cover 15 and the transmission diaphragm 17a, whereby the power-receiving coil cover 15 is air-tightly sealed without interfering with the transmission of an acoustic signal based on the vibration of the transmission diaphragm 17a.

The voice coil 17c is fixed to the inner surface side of the transmission diaphragm 17a and is driven by an acoustic signal input from the transmission amplifier 16 to cause the transmission diaphragm 17a to vibrate.

The power-receiving control unit 18 is a software control device that includes a microprocessor and a memory and operates based on a predetermined power-receiving control program, and comprehensively controls the power-receiving function of the vehicle M. As details will be described later, the power-receiving control unit 18 outputs an acoustic signal to the transmission amplifier 16, for example, based on a control program stored in a nonvolatile storage unit therein.

The operation of the wireless power supply system A having the above-mentioned configuration will be described below.

First, the operations of the vehicle M and the power-supplying device S during non-supply of electric power will be described. The power-receiving control unit 18 of the vehicle M stops the charging circuit 13 during non-supply of electric power (for example, when the vehicle M runs under control of a driver). Meanwhile, the power-supplying control unit 8 of the power-supplying device S stops the power-supplying circuit 3 during non-supply of electric power, that is, when the vehicle M to be supplied with electric power does not stop at the parking or stopping position.

Thereafter, the driver drives the vehicle M, moves the vehicle M to an installation position of the power-supplying device S, stops the vehicle, and inputs a charging instruction to the power-receiving control unit 18 to start the charging operation of the vehicle M by operating a charging instruction button which is not shown. The power-receiving control unit 18 of the vehicle M causes the charging circuit 13 to start the charging operation when the charging instruction is input thereto. In addition, the power-receiving control unit 18 periodically outputs an acoustic signal to the transmission amplifier 16. That is, the power-receiving control unit 18 controls the transmitters 17 to periodically transmit an acoustic signal to the power-supplying device S.

An example of the periodic acoustic signal is an acoustic signal in which a pattern in which a certain acoustic level or higher is output for 0.6 seconds and an acoustic level of 0 (silence) is output for 0.4 seconds is repeated at a cycle of 1 second.

The power-supplying control unit 8 of the power-supplying device S receives an acoustic signal from the vehicle M through the reception amplifier 7. That is, when the receivers 6 receive the acoustic signal from the vehicle M, the power-supplying control unit 8 causes the power-supplying circuit 3 to perform the power-supplying operation. Meanwhile, the power-receiving control unit 18 of the vehicle M appropriately charges the battery 14 by controlling the charging circuit 13 while monitoring the state of charge of the battery, 14, and causes the transmitters 17 to transmit a periodic acoustic signal by periodically outputting an acoustic signal to the transmission amplifier 16.

When the receivers 6 receive an acoustic signal from the vehicle M, that is, when an acoustic signal from the vehicle M is input through the reception amplifier 7, the power-supplying control unit 8 of the power-supplying device S causes the power-supplying circuit 3 to start the power-supplying operation. Thereafter, the power-receiving control unit 18 of the vehicle M transmits information such as a state of charge of the battery 14, an amount of electric power to be received (an amount of electric power output from the power-receiving circuit 12 to the battery 14), a voltage or a current generated across the power-receiving coil 11, and the like to the power-supplying device S using an acoustic signal. The power-supplying control unit 8 of the power-supplying device S adjusts an amount of electric power to be supplied, a power supply frequency, and a duty ratio or a driving frequency of pulse width modulation (PWM) control of the power-supplying circuit 3 based on the information received using the acoustic signal from the power-receiving side, thereby realizing maximum transmission efficiency.

Thereafter, when it is sensed that the battery 14 is fully charged, the power-receiving control unit 18 of the vehicle M stops the output of the periodic acoustic signal to the transmission amplifier 16. That is, the periodic transmission of an acoustic signal from the transmitters 17 to the power-supplying device S is stopped. At the same time, an indicator, which is not shown, notifies that the battery 14 is fully charged.

Since the periodic acoustic signal from the vehicle M is not received, the power-supplying control unit 8 of the power-supplying device S stops the control of the power-supplying circuit 3. Accordingly, the charging operation of the battery 14 of the vehicle M from the power-supplying device S using the wireless supply of electric power terminates. In the above-mentioned example of the periodic signal, since the silent section continues for 0.4 seconds, the power-supplying control unit 8 stops the control of the power-supplying circuit 3 when the acoustic signal is not received for 0.4 seconds or longer.

When the driver recognizes the fully-charged state using the indicator, which is not shown, the driver drives the vehicle M to move from the position of the power-supplying device S.

There may be a case in which the battery 14 is not fully charged, but a certain abnormality occurs in the power-receiving circuit 12, in the charging circuit 13 or in the battery 14, and thus the wireless supply of electric power has to be stopped.

When such an abnormality is sensed, the power-receiving control unit 18 of the vehicle M stops the output of the periodic acoustic signal to the transmission amplifier 16, that is, stops the periodic output of an acoustic signal from the transmitters 17 to the power-supplying device S.

Since the periodic acoustic signal from the vehicle M is not received, the power-supplying control unit 8 of the power-supplying device S stops the control of the power-supplying circuit 3. Accordingly, the charging operation of the battery 14 of the vehicle M from the power-supplying device S using the wireless supply of electric power terminates. In the above-mentioned example of the periodic signal, since the silent section continues for 0.4 seconds, the power-supplying control unit 8 stops the control of the power-supplying circuit 3 when the acoustic signal is not received for 0.4 seconds or longer.

There may be still a case in which the battery 14 is not fully charged, but the driver drives the vehicle M to move from the installation position of the power-supplying device S. In this case, the power-receiving control unit 18 of the vehicle M continues to output the periodic acoustic signal to the transmission amplifier 16 and the periodic acoustic signal is transmitted from the transmitters 17 to the power-supplying device S. However, since the transmitters 17 and the receivers 6 do not align with each other due to the movement of the vehicle M, the acoustic signal does not arrive at the receivers 6. Accordingly, since the periodic acoustic signal from the vehicle M is not received, the power-supplying control unit 8 of the power-supplying device S stops the control of the power-supplying circuit 3. Accordingly, the charging operation of the battery 14 of the vehicle M from the power-supplying device S using the wireless supply of electric power terminates. In the above-mentioned example of the periodic signal, since the silent section continues for 0.4 seconds, the power-supplying control unit 8 stops the control of the power-supplying circuit 3 when the acoustic signal is not received for 0.4 seconds or longer.

The following effects can be achieved in this embodiment by providing four transmitters 17 and four receivers 6 so as to transmit the same acoustic signal.

(a) Even when a foreign object intercepting (blocking) sound is present at any one position of four receivers 6, the acoustic signal can be received using the receivers 6 not blocked by the foreign object.

(b) Even when the vehicle M stops in a direction in which the vehicle is rotated 90° to the left or 90° to the right or 180° to face the opposite direction, the transmitters 17 and the receivers 6 align with each other and thus it is possible to transmit an acoustic signal.

According to this embodiment, by enabling communication between the power-supplying device S and the vehicle M using an acoustic signal, it is possible to transmit information between the power-receiving side and the power-supplying side without using radio waves or light waves and to appropriately control the wireless supply of electric power. In this embodiment, communication can be carried out even when a contaminant blocking light is present. In this embodiment, both the wireless supply of electric power and the communication using an acoustic signal can be excellently carried out with high efficiency when the power-supplying coil 4 and the power-receiving coil 11 (or the covers thereof) align with each other. When they are misaligned, both the wireless supply of electric power and the communication using an acoustic signal become difficult. When the wireless supply of electric power is not possible, that is, when the power-supplying coil 4 and the power-receiving coil 11 have a deviated positional relationship, the communication using an acoustic signal also becomes difficult. Accordingly, even when multiple sets of power-supplying coils 4 and power-receiving coils 11 are present, the possibility of crosstalk is low.

While the embodiment of the present invention has been described above, the present invention is not limited to the embodiment and, for example, the following modifications can be considered.

Figure 3A:
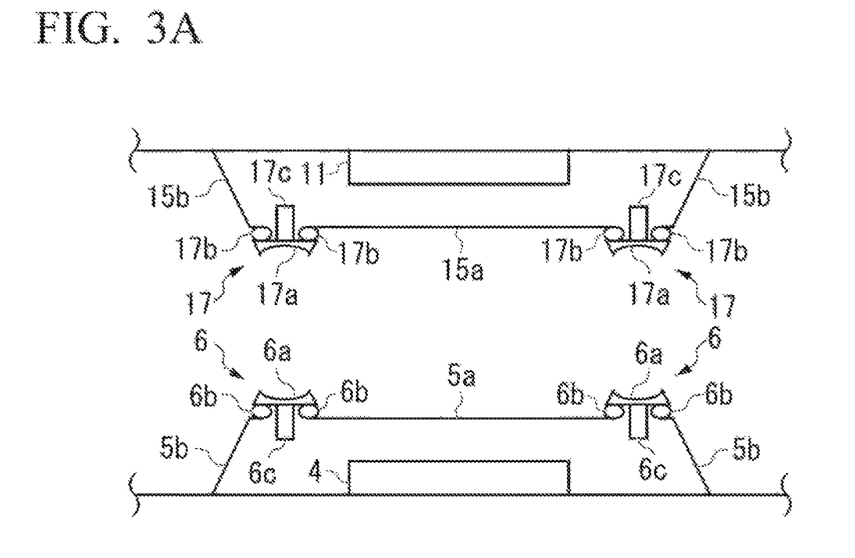
FIG. 3A is a diagram showing a variant example of the wireless power supply system according to the embodiment of the present invention.

(1) In the above-mentioned embodiment, the vehicle M employs the flat transmission diaphragm 17a, but may employ a transmission diaphragm 17a having a shape (curved concave shape) causing an acoustic signal to have directionality as shown in FIG. 3A. Similarly, the power-supplying device S may employ a reception diaphragm 6a having a curved concave shape as shown in FIG. 3A.

Figure 3B:
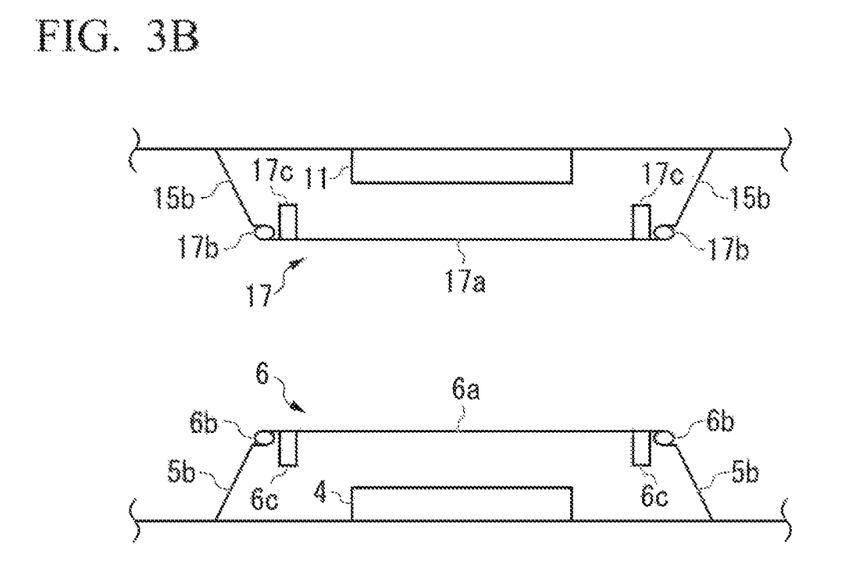
FIG. 3B is a diagram showing a variant example of the wireless power supply system according to the embodiment of the present invention.
Figure 3C:
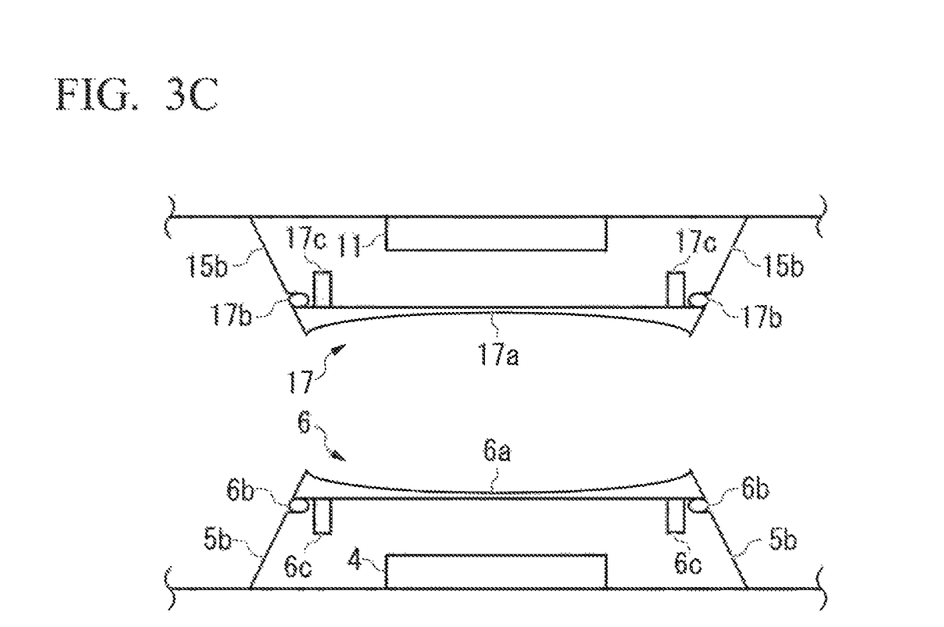
FIG. 3C is a diagram showing a variant example of the wireless power supply system according to the embodiment of the present invention.

In the vehicle M, a transmission diaphragm 17a may be disposed in the entire area of the flat cover 15a to transmit an acoustic signal as shown in FIG. 3B. Similarly, in the power-supplying device S, a reception diaphragm 6a may be disposed in the entire area of the flat cover 5a to receive an acoustic signal as shown in FIG. 3B. In the vehicle M, the transmission diaphragm 17a shown in FIG. 3B may be formed to have a shape (curved concave shape) causing an acoustic signal to have directionality as shown in FIG. 3C. Similarly, in the power-supplying device S, the reception diaphragm 6a shown in FIG. 3B may be formed to have a curved concave shape as shown in FIG. 3C.

The reception diaphragm 16a and the transmission diaphragm 17a may be formed of the same material (for example, engineering plastic) as the power-supplying coil cover 5 or the power-receiving coil cover 15. An acoustic signal may be transmitted or received using the power-supplying coil cover 5 or the power-receiving coil cover 15 themselves instead of the diaphragm.

(2) In the above-mentioned embodiment, the pickup coil 6c or the voice coil 17c is used to transmit or receive an acoustic signal, but a piezoelectric element may be used instead of the pickup coil 6c or the voice coil 17c.

(3) in the above-mentioned embodiment, the vehicle M may stop the transmission of the periodic acoustic signal when the wireless supply of electric power is not necessary. Since the periodic acoustic signal is not received, the power-supplying device S stops the supply of electric power to the vehicle M.

(4) In the above-mentioned embodiment, when air is used as a transmission medium, in order to enhance transmission efficiency of an acoustic signal, a vibration frequency band of 30 kHz may be used.

(5) In the above-mentioned embodiment, four transmitters 6 and four receivers 17 are disposed, but the numbers thereof may be one or more than one other than four.

(6) In the above-mentioned embodiment, an acoustic signal is transmitted or received using the transmitters 17 or the receivers 6, but an acoustic signal may be transmitted or received using a general loud speaker or microphone instead of the transmitters 17 or the receivers 6.

(7) In the above-mentioned embodiment, the state of charge of the battery 14, the amount of electric power to be received (an amount of electric power output from the power-receiving circuit 12 to the battery), and the voltage or current generated across the power-receiving coil 11 are the information transmitted using an acoustic signal, but information to be transmitted is not limited thereto. Other information such as the integrated travel distance of the vehicle M or the position measured using the global positioning system (GPS) may be transmitted.

(8) In the above-mentioned embodiment, the vehicle M is a transmission side and the power-supplying device S is a reception side, but the reception-side function may be added to the vehicle M and the transmission-side function may be added to the power-supplying device S.

(9) In the above-mentioned embodiment, the wirelessly supplied electric power is used to charge the battery 14, but the wirelessly supplied electric power may be used for applications (illumination, driving of a motor, or the like) other than the charging of the battery 14.

(10) In the above-mentioned embodiment, the magnetic resonance method is employed as the method of wirelessly supplying electric power, but an electromagnetic induction method may be employed.

(11) The power-supplying coil 4 or the power-receiving coil 11 is not limited to the helical coil. A coil of an arbitrary type or shape such as a solenoid shape can be employed as long as electric power can be wirelessly supplied between the power-supplying coil 4 and the power-receiving coil 11, and the types, shapes, and sizes of the coils may be different from each other.

(12) The shape of the power-supplying coil cover is not limited to the circular shape, and any shape may be employed as long as the power-supplying coil is incorporated therein. Similarly, the shape of the power-receiving coil cover is not limited to the circular shape, and any shape may be employed as long as the power-receiving coil is incorporated therein. The shapes and sizes of the power-supplying coil cover and the power-receiving coil cover may be different from each other.

(13) The vehicle M may be an unmanned carrier or a remotely-controlled vehicle not requiring a driver. The vehicle is not limited to an automobile, but may be various types of land-mobile bodies or air-mobile bodies which can hover.

(14) In the above-mentioned embodiment, the wireless supply of electric power and the transmission of an acoustic signal from the power-supplying device S buried in the ground to the vehicle M are carried out using air as a transmission medium, but the power-supplying device S may be installed in water and the wireless supply of electric power and the transmission of an acoustic signal may be performed on an on-water or underwater mobile body using water as a transmission medium. The internal configuration of the on-water or underwater mobile body is the same as the internal configuration of the vehicle M shown in FIG. 1. In order to prevent leakage of water, the power-supplying coil cover 5, the reception diaphragm 6a, the sealing material 6b, the power-receiving coil cover 15, the transmission diaphragm 17a, and the sealing material 17b are formed of waterproof materials so as to have waterproof structures and strengths capable of enduring a water pressure at a depth at which the devices are used. When water is used as a transmission medium, a vibration frequency band of 150 kHz may be used.

INDUSTRIAL APPLICABILITY

It is possible to provide a wireless power supply system that transmits information between a power-receiving side and a power-supplying side without using radio waves or light waves and that appropriately controls wireless supply of electric power.

The invention claimed is:

1. A wireless power supply system comprising:
a power-supplying device having a power-supplying coil and a first cover covering the power-supplying coil;
a power-receiving device having a power-receiving coil and a second cover covering the power-receiving coil, electric power being wirelessly supplied from the power-supplying coil to the power-receiving coil; and
a plurality of receivers and a plurality of transmitters configured to perform communication between the power-supplying device and the power-receiving device using an acoustic signal,
wherein the plurality of receivers are arranged at equal intervals on one of the first cover and the second cover along an outer circumference of the one of the first cover and the second cover, and
the plurality of transmitters are arranged at equal intervals on the other of the first cover and the second cover along an outer circumference of the other of the first cover and the second cover.

2. The wireless power supply system according to claim 1, wherein each of the plurality of transmitters includes a transmission diaphragm installed in a part of the other of the first cover and the second cover, and a sealing material having flexibility and installed in a boundary between the other of the first cover and the second cover and the transmission diaphragm, and the acoustic signal is transmitted using the transmission diaphragm.

3. The wireless power supply system according to claim 2, wherein the transmission diaphragm has a shape causing the acoustic signal to have directionality.

4. The wireless power supply system according to claim 1, wherein each of the plurality of receivers includes a reception diaphragm installed in a part of the one of the first cover and the second cover, and a sealing material having flexibility and installed in a boundary between the one of the first cover and the second cover and the reception diaphragm, and the acoustic signal is received using the reception diaphragm.

5. The wireless power supply system according to claim 2, wherein each of the plurality of receivers includes a reception diaphragm installed in a part of the one of the first cover and the second cover, and a sealing material having flexibility and installed in a boundary between the one of the first cover and the second cover and the reception diaphragm, and the acoustic signal is received using the reception diaphragm.

6. The wireless power supply system according to claim 3, wherein each of the plurality of receivers includes a reception diaphragm installed in a part of the one of the first cover and the second cover, and a sealing material having flexibility and installed in a boundary between the one of the first cover and the second cover and the reception diaphragm, and the acoustic signal is received using the reception diaphragm.

7. The wireless power supply system according to claim 1,
wherein the power-receiving device periodically transmits the acoustic signal during wireless supply of electric power, and
wherein the power-supplying device stops the supply of electric power when the periodic acoustic signal is not received during wireless supply of electric power.

8. The wireless power supply system according to claim 7, wherein the power-receiving device stops the periodic transmission of the acoustic signal when the wireless supply of electric power is not necessary.

9. A wireless power supply system that includes a power-supplying device having a power-supplying coil and a power-receiving device having a power-receiving coil and that wirelessly supplies electric power from the power-supplying coil to the power-receiving coil,
wherein the power-supplying device and the power-receiving device communicate with each other using an acoustic signal, and
wherein a transmission diaphragm is installed in a part of at either or both of the cover covering the power-supplying coil and the cover covering the power-receiving coil, a sealing material having flexibility is installed in a boundary between the cover and the transmission diaphragm, and the acoustic signal is transmitted using the transmission diaphragm.

10. A wireless power supply system that includes a power-supplying device having a power-supplying coil and a power-receiving device having a power-receiving coil and that wirelessly supplies electric power from the power-supplying coil to the power-receiving coil,
wherein the power-supplying device and the power-receiving device communicate with each other using an acoustic signal,
wherein the power-receiving device periodically transmits the acoustic signal during wireless supply of electric power, and
wherein the power-supplying device stops the supply of electric power when the periodic acoustic signal is not received during wireless supply of electric power.

* * * * *